United States Patent [19]

Tanno

[11] Patent Number: 4,546,959

[45] Date of Patent: Oct. 15, 1985

[54] SHOCK ABSORBER HAVING ADJUSTABLE DAMPING MEANS INCLUDING AN AUXILIARY OIL TANK

[75] Inventor: Satoru Tanno, Gyoda, Japan

[73] Assignee: Showa Manufacturing Co., Ltd., Tokyo, Japan

[21] Appl. No.: 234,443

[22] Filed: Feb. 13, 1981

[30] Foreign Application Priority Data

Jul. 10, 1980 [JP] Japan .............................. 55-96291[U]

[51] Int. Cl.⁴ .............................................. F16F 9/48
[52] U.S. Cl. .................................. 267/64.15; 188/285; 188/299; 188/314; 251/206
[58] Field of Search ........................ 267/64.15–64.27, 267/122–124, 127; 188/269, 278, 281–282, 285–286, 298, 299, 313, 314–315, 318, 319, 322.13–322.15, 322.19; 251/206, 208

[56] References Cited

U.S. PATENT DOCUMENTS

| | | | |
|---|---|---|---|
| 935,329 | 9/1909 | Serrell et al. ........................ | 251/206 |
| 1,205,433 | 11/1916 | Christman ............................ | 188/319 |
| 1,253,143 | 1/1918 | Caldwell .............................. | 251/206 |
| 2,510,356 | 6/1950 | Werts ................................. | 251/206 X |
| 3,167,309 | 1/1965 | Wössner ............................. | 267/64.15 |
| 3,741,229 | 6/1973 | Gruver, Jr. .......................... | 251/206 X |
| 3,931,961 | 1/1976 | Fader et al. ......................... | 267/64.15 |
| 3,957,259 | 5/1976 | Peddinghaus ....................... | 267/64.15 |
| 4,050,684 | 9/1977 | Sanders .............................. | 188/314 X |
| 4,061,320 | 12/1977 | Warner ............................... | 267/64.15 |
| 4,139,182 | 2/1979 | Nagase et al. ...................... | 188/285 X |
| 4,153,237 | 5/1979 | Supalla .............................. | 267/64.15 |
| 4,159,756 | 7/1979 | Murakami et al. ................... | 188/319 |
| 4,174,098 | 11/1979 | Baker et al. ........................ | 188/285 X |
| 4,298,101 | 11/1981 | Dressell, Jr. et al. ............... | 188/285 |

FOREIGN PATENT DOCUMENTS

| | | | |
|---|---|---|---|
| 2508290 | 9/1976 | Fed. Rep. of Germany ...... | 251/206 |
| 54-19890 | 2/1979 | Japan . | |
| 1380900 | 1/1975 | United Kingdom ............. | 267/64.15 |

*Primary Examiner*—Douglas C. Butler
*Attorney, Agent, or Firm*—A. W. Breiner

[57] ABSTRACT

A hydraulic shock absorber comprising a cylinder containing a working oil; a piston received in a slidable manner in the cylinder and formed with a communication passage for generating a damping force, a piston rod protruding from one end of the cylinder; a valve chamber formed at the other end of the cylinder in fluid communication with the inside of the cylinder; an oil tank having an oil port for communication with the valve chamber; a disc-shaped valve arranged in the valve chamber and formed with a plurality of oil holes which have different effective areas and which can selectively be brought to face the oil port which communicates with the valve chamber and oil tank when the disc-shaped valve is turned. The disc-shaped valve is preferably mounted slidably but non-rotatably upon a valve stem. A coil spring is preferably provided to urge the disc-shaped valve against the valve chamber. At the same time, the valve stem has its one end protruding to the outside, and a turn knob is mounted on the protruding end of the valve stem for turning the disc-shaped valve. The damping force under compression can be changed without difficulty by turning the turn knob.

7 Claims, 3 Drawing Figures

U.S. Patent  Oct. 15, 1985  4,546,959
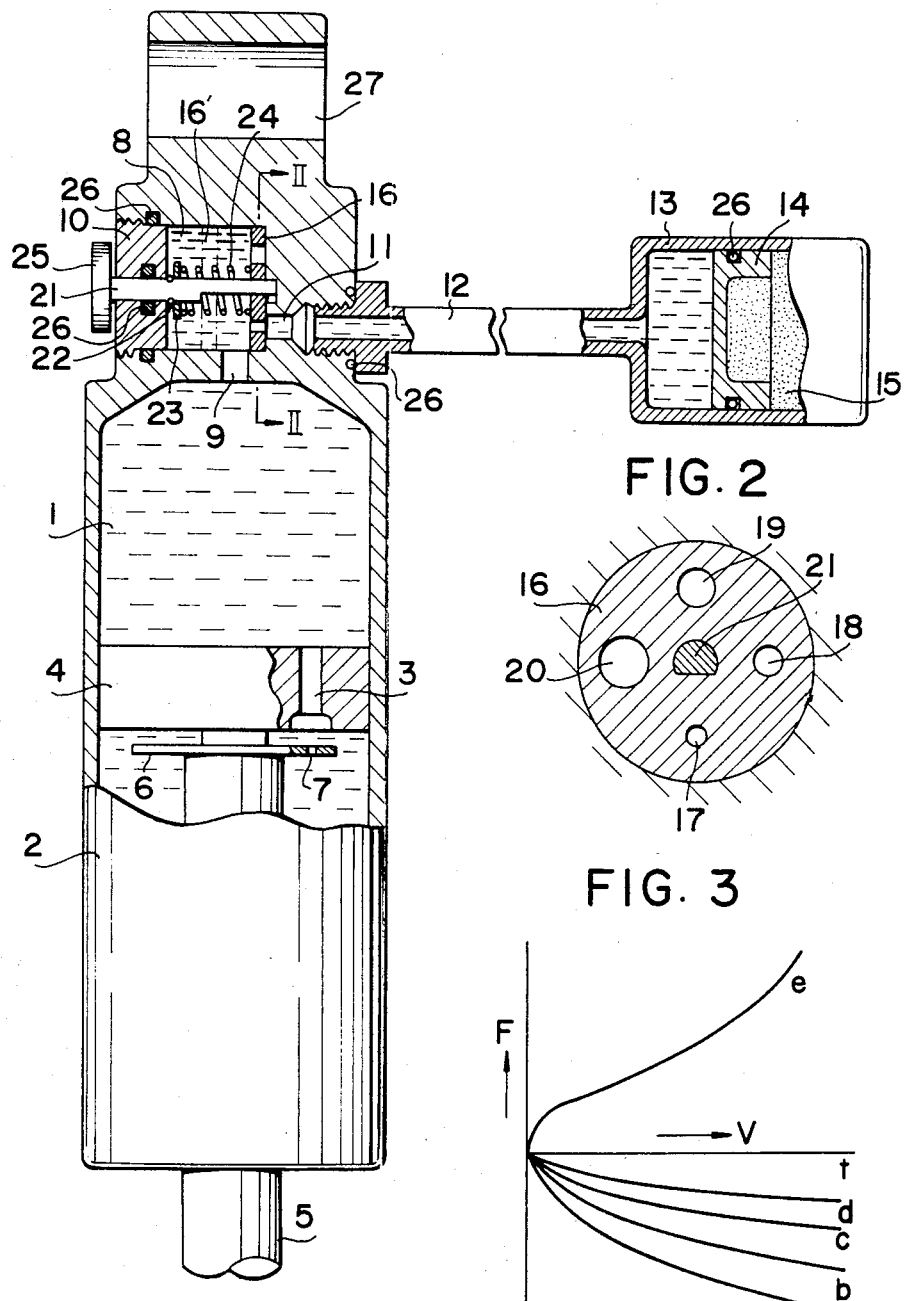

1

SHOCK ABSORBER HAVING ADJUSTABLE DAMPING MEANS INCLUDING AN AUXILIARY OIL TANK

BACKGROUND OF THE INVENTION

1. Field of the Invention

The present invention relates to a hydraulic shock absorber, and more particularly to a hydraulic shock absorber for use as the rear cushion of an off-the-road motorcycle.

2. Description of the Prior Art

In an off-the-road motorcycle, more particularly in a motocross motorcycle, it is desired to change the damping force of the rear cushion under compression in accordance with the road condition or the preference of a driver.

One of the hydraulic shock absorbers made capable of adjusting the damping force under compression is disclosed in and known from Japanese Utility Model Specification No. 54-19890, which was laid open for public inspection on Feb. 8, 1979. This disclosed shock absorber has not been used on motocross motorcycles because the adjustment of the damping force requires the skills of an experienced service man and, additionally, takes a long time.

In the motocross motorcycle or the like, therefore, a plurality of shock absorbers having different damping forces are prepared in advance and are replaced in accordance with the road condition or the preference of the driver. According to this current practice, however, considerable time is wasted in making the replacement.

SUMMARY OF THE INVENTION

It is, therefore, an object of the present invention to provide a hydraulic shock absorber which can have its damping force under compression changed with ease.

According to a feature of the present invention, a shock absorber is provided having a valve chamber disposed at one end of a cylinder such that it has communication with an oil tank through an oil port, and a disc-shaped valve, which can be turned from the outside of the shock absorber and which is made slidable in the diametrical direction of the cylinder, which is formed with a plurality of oil holes having different effective areas, whereby one of the oil holes and the aforementioned oil port can be registered so that the damping force under compression can be adjusted.

Further objects, advantages, and features of the present invention will become more fully apparent from a detailed consideration of the arrangement and construction of the constituent parts as set forth in the following specification taken together with the accompanying drawing.

BRIEF DESCRIPTION OF THE DRAWING

FIG. 1 is a longitudinal section showing one embodiment of the hydraulic shock absorber according to the present invention;

FIG. 2 is a section taken along line II—II of FIG. 1; and

FIG. 3 is a graphical presentation illustrating the characteristics of the hydraulic shock absorber according to the present invention.

DETAILED DESCRIPTION OF THE PREFERRED EMBODIMENT

In FIGS. 1 and 2, a piston 4 formed with a communication passage 3 for generating a damping force is slidably fitted in a cylinder 2 filled with working oil 1. A piston rod 5 protrudes from the lower end of the cylinder, and a disc valve 6 arranged to face the underside of the piston 4 is formed with an orifice 7.

A diametrically opposed cylindrical valve chamber 8 is disposed at the upper end of the cylinder 2 which is constructed and arranged to communicate with the inside of the cylinder 2 by way of an oil port 9 and which is sealed by means of a plug 10 fastened to the side of the cylinder 2. One side of the valve chamber 8 is formed with an oil port 11 which provides communication between valve chamber 8 and an oil tank 13 by way of a conduit 12. In the oil tank 13 there is fitted a free piston 14, the back chamber of which is filled with a working gas 15 which is maintained under a suitable pressure. As a result, simultaneously with the movements of the piston 4, the aforementioned free piston 14 is moved to compensate the volumetric change of the piston rod 5 in the inside of the cylinder 2.

A disc-shaped valve 16 is arranged to face the end of the aforementioned valve chamber 8. The disc-shaped valve 16 is formed with a plurality of oil holes 17, 18, 19, and 20 which have different effective areas and which have their centers so arranged on an identical circle 20 that a selected one of them may be brought to face the aforementioned oil port 11 by the rotations of disc-shaped valve 16. At the same time, this disc-shaped valve 16 is mounted slidably but not rotatably upon a valve stem 21 which is rotatably fitted in the aforementioned plug 10. A spring 24 urges the aforementioned valve 16 onto the end of the valve chamber 8 and is held under tension between said valve 16 and a spring seat 23 which in turn is mounted on the valve stem 21 by means of a snap ring 22. The valve stem 21 has its one end protruding to the outside, and a turn knob 25 formed with position indicating protrusions or the like is mounted on the protruding end of the valve stem 21. In the drawing, reference numerals 26 and 27 indicate an O-ring and a mounting eye, respectively.

In case the hydraulic shock absorber having the construction thus far described is compressed so that the piston 4 is moved upward, the valve 6 is opened, as shown in FIG. 1, so that the oil above the piston 4 flows down with relative ease through the communication passage 3. However, the oil corresponding to the volume replaced by the piston rod 5 inserted into the cylinder 2 is pumped through the oil port 9 and one of the oil holes of the disc-shaped valve 16, e.g., the oil hole 17 (as shown in FIG. 2) into the oil tank 13 by way of the conduit 12.

As a result, when the oil passes through the oil hole 17, there is established a damping force corresponding to the effective area of the oil hole. Thus, a desired damping force can be attained by turning the turn knob 25 to bring one of selected oil holes 17, 18, 19, and 20 having the desired effective area into a position to face the oil port 11. More specifically, if the moving velocity of the piston is denoted at V, the damping forces F under compression, as indicated at curves a, b, c and d in FIG. 3, are generated by bringing the oil holes 17, 18, 19, and 20 into the position to face the oil port 11. In the extension stroke of the shock absorber, on the contrary, since the valve 6 is closed, the oil below the piston 4 will flow upward through the orifice 7 to thereby establish a strong damping force. In this instance, moreover, the oil in the tank 13 is supplied into the cylinder 2 so that the valve 16 is shifted to the position shown in dotted lines 16' by the oil pressure transmitted. As a result, the oil port 11 is opened to ensure the communication with the inside of the cylinder 2 so that little damping force is established at that portion. Thus, the damping force in the extension stroke is represented by curve e in FIG. 3 independently of the angular position of the valve 16.

In this way, the hydraulic shock absorber according to the present invention can have its damping force under compression adjusted in a remarkably simple and quick manner merely by turning the turn knob. Consequently, proper riding comfort can be obtained in accordance with the road condition or the like, especially in the case of the shock absorber of the present invention being used as the rear cushion of a motocross motorcycle. Moreover, since there is no necessity for providing an adjusting member on the piston, the mechanism can be so simplified as to eliminate the fear of any trouble. By filling the oil tank with a gas under high pressure, cavitation or the like in the oil is prevented to ensure stable operations.

While the present invention has been described with reference to particular embodiments thereof, it will be understood that numerous modifications may be made by those skilled in the art without actually departing from the spirit and scope of the present invention as defined in the appended claims.

It is claimed:

1. A hydraulic shock absorber comprising: a cylinder filled with a working oil; a piston slidably fitted in said cylinder and including damping force generating means; a valve chamber formed at one end of said cylinder and having communication means communicating with the inside of said cylinder; a piston rod protruding from the other end of said cylinder to the outside thereof; an oil tank having communication means for communication with said valve chamber by way of an oil port in said valve chamber; a first disc-shaped valve in said valve chamber and formed with a plurality of oil holes which have different effective areas and which have their centers arranged on an identical circle; a valve stem protruding from said first disc-shaped valve to the outside of said cylinder for turning said first disc-shaped valve; whereby said first disc-shaped valve can be turned by turning said valve stem to make a select one of said oil holes face the oil port of said valve chamber.

2. A hydraulic cylinder according to claim 1, wherein said oil port in said valve chamber is at one end thereof; the protruding end of said valve stem is equipped with a turn knob, and a spring is positioned on said valve stem for urging said first disc-shaped valve against said valve chamber and toward said oil port in said valve chamber communicating with said oil tank.

3. A hydraulic shock absorber according to claim 2, wherein said spring is held under tension between said first disc-shaped valve and a spring seat which is mounted on said valve stem.

4. A hydraulic shock absorber according to claim 2, wherein said turn knob is formed with position indicating projections.

5. A hydraulic shock absorber according to claim 2, wherein said first disc-shaped valve is made movable in the diametrical direction of said cylinder while completely ensuring communication between said valve chamber and the inside of said cylinder.

6. A hydraulic shock absorber according to claim 1, wherein said oil tank receives a free piston separating the working oil and a working gas.

7. A hydraulic shock absorber according to claim 1, wherein said damping force generating means includes a communication passage formed to axially extend through said piston, and a second disc valve arranged to face the underside of said piston and formed with an orifice.

* * * * *